United States Patent
Cheng et al.

(10) Patent No.: US 11,321,091 B2
(45) Date of Patent: May 3, 2022

(54) STORAGE DEVICES MAPPED TO REGISTERS AND MAPPING METHODS THEREOF

(71) Applicant: Nuvoton Technology Corporation, Hsinchu Science Park (TW)

(72) Inventors: Nai-Wen Cheng, Hsinchu (TW); Tzu-Lan Shen, Taoyuan (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 0 days.

(21) Appl. No.: 16/871,649

(22) Filed: May 11, 2020

(65) Prior Publication Data
US 2021/0124584 A1 Apr. 29, 2021

(30) Foreign Application Priority Data
Oct. 29, 2019 (TW) ................. 108138962

(51) Int. Cl.
*G06F 9/30* (2018.01)
*G06F 9/38* (2018.01)
(52) U.S. Cl.
CPC ........ *G06F 9/30123* (2013.01); *G06F 9/3836* (2013.01)
(58) Field of Classification Search
CPC .............. G06F 9/30123; G06F 9/3836; G06F 9/30138; G06F 9/30098; G06F 9/30116; G06F 12/023
See application file for complete search history.

(56) References Cited

U.S. PATENT DOCUMENTS

| | | | | |
|---|---|---|---|---|
| 4,853,846 A | * | 8/1989 | Johnson | G06F 12/0862 710/300 |
| 5,696,923 A | * | 12/1997 | Robertson | G06F 3/14 711/100 |
| 5,949,787 A | | 9/1999 | Wegner et al. | |
| 7,197,627 B1 | * | 3/2007 | Naylor | G06F 9/30098 712/34 |
| 2005/0166036 A1 | | 7/2005 | Catherwood et al. | |
| 2010/0262805 A1 | * | 10/2010 | Justice | G06F 13/26 712/37 |
| 2014/0281283 A1 | * | 9/2014 | Shacham | G06F 11/0757 711/149 |

OTHER PUBLICATIONS

Taiwan Office Action and Search Report issued in corresponding Taiwan application No. 108138962, Sep. 28, 2020, 4 pages.

* cited by examiner

*Primary Examiner* — Farley Abad
(74) *Attorney, Agent, or Firm* — Muncy, Geissler, Olds & Lowe, PC

(57) ABSTRACT

A storage device, which is coupled to a host and a first register, includes a first mapping register, a shadow register, and a controller. The first mapping register is configured to store the first address of the first register. The shadow register includes a first shadow section mapped to a register section of the first register. The controller receives an initialization instruction generated by the host to write the first address into the first mapping register so that the first shadow section is mapped to the first register section.

18 Claims, 2 Drawing Sheets

STORAGE DEVICES MAPPED TO REGISTERS AND MAPPING METHODS THEREOF

CROSS REFERENCE TO RELATED APPLICATIONS

This application claims priority of Taiwan Patent Application No. 108138962, filed on Oct. 29, 2019, the entirety of which is incorporated by reference herein.

BACKGROUND OF THE INVENTION

Field of the Invention

The disclosure relates generally to a storage device, and more particularly it relates to a storage device mapped to a register and a mapping method thereof.

Description of the Related Art

At present, the way that a central processor accesses a register is usually to specify a register address and then to access the content of the register. When the central processor frequently needs to accesses the content of a plurality of registers, it would waste lots of time to repeatedly specify the register addresses. In order to improve the timing and achieve synchronization and thereby to improve the performance of the central processor, it is necessary to optimize the way that a plurality of registers with non-fixed addresses are accessed simultaneously.

BRIEF SUMMARY OF THE INVENTION

In an embodiment, a storage device, which is coupled to a host and a first register, comprises a first mapping register, a shadow register, and a controller. The first mapping register is configured to store a first address of the first register. The shadow register comprises a first shadow section, which is mapped to a first register section of the first register. The controller receives an initialization instruction generated by the host to write the first address into the first mapping register so that the first mapping section is mapped to the first register section.

According to an embodiment of the invention, the first register section has a first section address, wherein the first storage device further comprises a first mask register. The first mask register is configured to store the first section address. The controller further writes the first section address into the first mask register according to the initialization instruction.

According to an embodiment of the invention, the storage device further comprises an enable register. The enable register comprises a first enable section. When the controller writes a first logic level into the first enable section according to the initialization instruction, the first shadow section is mapped to the first register section. When the controller writes a second logic level into the first enable section according to the initialization instruction, the mapping of the first shadow section to the first register section is stopped.

According to an embodiment of the invention, when the host executes a write procedure to write first data into the first register section and the first enable section is at the first logic level, the host writes the first data into the first shadow section and then the controller writes the first data from the first shadow section into the first register section. When the hosts executes the write procedure and the first enable section is at the second logic level, the host writes the first data directly into the first register section.

According to an embodiment of the invention, when the host executes a read procedure to read the first register section and the first enable section is at the first logic level, the host reads the first shadow section. When the host executes the read procedure and the first enable section is at the second logic level, the host reads the first register section directly.

According to an embodiment of the invention, the storage device is further coupled to a second register, and the second register has a second address and comprises a second register section. The shadow register further comprises a second shadow section. The storage device further comprises a second mapping register. The second mapping register is configured to store the second address. When the controller receives the initialization instruction, the controller further writes the second address into the second mapping register so that the second shadow section is mapped to the second register section.

According to an embodiment of the invention, the second register section has a second section address. The storage device further comprises a second mask register. The second mask register is configured to store the second section address. When the controller receives the initialization instruction, the controller writes the second section address into the second mask register.

According to an embodiment of the invention, the enable register further comprises a second enable section. When the controller writes the first logic level into the second enable section, the second shadow section is mapped to the second register section. When the controller writes the second logic level into the second enable section, the mapping of the second shadow section to the second register section is stopped.

According to an embodiment of the invention, when the host executes a write procedure to write first data into the first register section and to write second data into the second register section and the first enable section and the second enable section are at the first logic level, the host writes the first data into the first shadow section and writes the second data into the second shadow section, and then the controller writes the first data from the first shadow section into the first register section and writes the second data from the second shadow section into the second register section. When the host executes the write procedure and the first enable section and the second enable section are at the second logic level, the host writes the first data directly into the first register section and writes the second data directly into the second register section.

According to an embodiment of the invention, when the host executes a read procedure to read the first data from the first register section and the second data from the second register section and the first enable section and the second enable section are at the first logic level, the host reads the first data from the first shadow section and reads the second data from the second shadow section. When the host executes the read procedure and the first enable section and the second enable section are at the second logic level, the host reads the first data directly from the first register section and it reads the second data from the second register section.

In another embodiment, a mapping method adapted to a storage device is provided. The storage device is coupled to a host and a first register and comprises a shadow register. The mapping method comprises: receiving an initialization instruction generated by the host; storing a first address of a first register according to the initialization instruction; and mapping a first shadow section of the shadow register to a first register section of the first register.

According to an embodiment of the invention, the mapping method further comprises: storing a first section address of the first register section according to the initialization instruction.

According to an embodiment of the invention, the shadow register further comprises an enable register. The mapping method further comprises: writing a first logic level into a first enable section of the enable register according to the initialization instruction; when the first enable section is at the first logic level, mapping the first shadow section to the first register section; and when the first enable section is at the second logic level, stopping the mapping of the first shadow section to the first register section.

According to an embodiment of the invention, when the host generates a write instruction to write first data into the first register section and the first enable section is at the first logic level, the host writes the first data into the first shadow section, and then the first data is written from the first shadow section into the first register section. When the host generates the write instruction and the first enable section is at the second logic level, the host writes the first data directly into the first register section.

According to an embodiment of the invention, when the host generates a read instruction to read the first register section and the first enable section is at the first logic level, the host reads the first shadow section. When the host generates the read instruction and the first enable section is at the second logic level, the host reads the first register section directly.

According to an embodiment of the invention, the storage device is further coupled to a second register, and the second register comprises a second register section. The shadow register further comprises a second shadow section. The mapping method further comprises: storing a second address of the second register according to the initialization instruction; and mapping a second shadow section of the shadow register to the second register section.

According to an embodiment of the invention, the mapping method further comprises: storing a second section address of the second register section according to the initialization instruction.

According to an embodiment of the invention, the mapping method further comprises: writing the first logic level into a second enable section of the enable register according to the initialization instruction; when the second enable section is at the first logic level, mapping the second shadow section to the second register section; and when the second enable section is at the second logic level, stopping the mapping of the second shadow section to the second register section.

According to an embodiment of the invention, when the host generates a write instruction to write first data into the first register section and to write second data into the second register section and the first enable section and the second enable section are at the first logic level, the host writes the first data into the first shadow section and writes the second data into the second shadow section, and then the first data and the second data are respectively written from the first shadow section and the second shadow section into the first register section and the second register section. When the host generates the write instruction and the first enable section and the second enable section are at the second logic level, the host writes the first data directly into the first register section and writes the second data directly into the second register section.

According to an embodiment of the invention, when the host generates a read instruction to read the first data of the first register section and the second data of the second register section and the first enable section and the second enable section are at the first logic level, the host reads the first data from the first shadow section and reads the second data of the second shadow section. When the host generates the read instruction and the first enable section and the second section are at the second logic level, the host reads the first data directly from the first register section and it reads the second data directly from the second register section.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
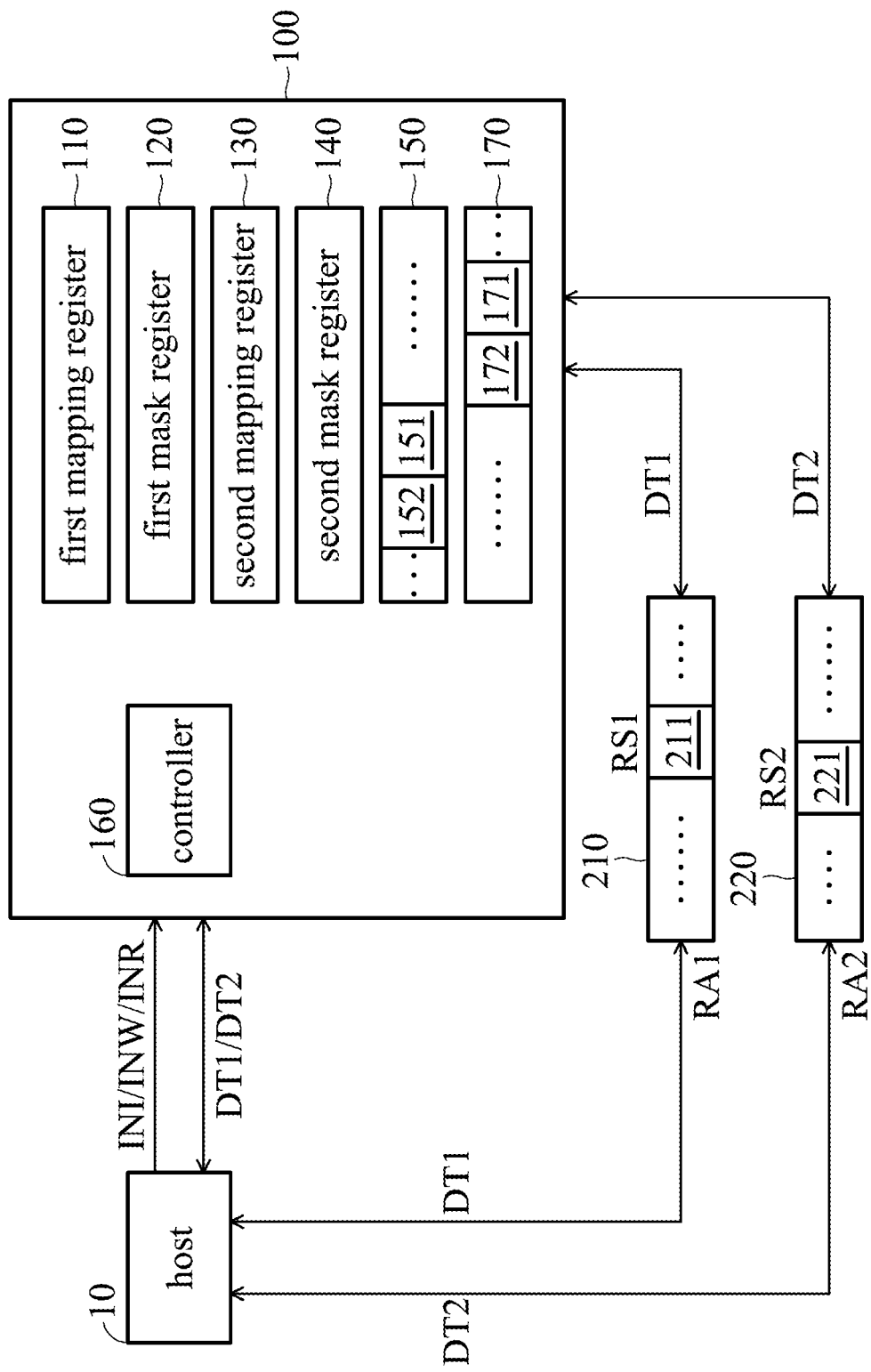
FIG. 1 is a block diagram of a storage device in accordance with an embodiment of the invention.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It should be understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

FIG. 1 is a block diagram of a storage device in accordance with an embodiment of the invention. As shown in FIG. 1, the storage device 100 is coupled to the host 10, a first register 210, and a second register 220. The storage device 100 includes a first mapping register 110, a first mask register 120, a second mapping register 130, a second mask register 140, a shadow register 150, and a controller 160.

The first register 210 includes a first register section 211, and the second register 220 includes a second register section 221. The host 10 accesses the data stored in the first register section 211 and the second register section 221. According to other embodiments of the invention, the host 10 and the storage device 100 may be coupled to only one register or coupled to a plurality of registers. It is merely illustrated herein that the host 10 and the storage device 100 are coupled to the first register 210 and the second register 220, but not intended to be limited thereto.

The shadow register 150 includes a first shadow section 151 and a second shadow section 152. According to an embodiment of the invention, when the controller 160 receives an initialization instruction INI generated by the host 10, the controller 160 stores a first section address RS1 of the first register section 211 in the first mask register 120 so that the first shadow section 151 is mapped to the first register section 211. According to an embodiment of the invention, the size of the first register section 211 can be determined by the designer.

In addition, the controller 160 further stores the second address RA2 of the second register 220 in the second mapping register 130 according to the initialization instruction INI and stores the second section address RS2 of the second register section 221 of the second register 220 in the second mask register 140, so that the second shadow section 152 is mapped to the second register section 221. According to an embodiment of the invention, the size of the second register section 221 can be determined by the designer.

According to an embodiment of the invention, when the host 10 executes the write instruction INW to write the first data DT1 into the first register section 211 and to write the second data DT2 into the second register section 221, the host 10 respectively writes the first data DT1 and the second data DT2 into the first shadow section 151 and the second shadow section 152, and then the controller 160 synchronizes the first data DT1 and the second data DT2 from the first shadow section 151 and the second shadow section 152 to the first register section 211 and the second register section 221 respectively.

According to another embodiment of the invention, when the host 10 executes a read instruction INR to read the first data DT1 in the first register section 211 and/or the second data DT2 in the second register section 221, the host 10 is able to directly access the first shadow section 151 and the second shadow section 152 of the shadow register 150 to read the first data DT1 and the second data DT2 since the first shadow section 151 is mapped to the first register section 221 and the second shadow section 152 is mapped to the second register section 221.

Since the shadow register 150 is mapped to the first register section 211 and the second register section 221 after the controller 160 receives the initialization instruction INI, the first data DT1 and the second data DT2 are stored in the shadow register 150. When the host 10 needs to simultaneously access the first data DT1 and the second data DT2, the first data DT1 and the second data DT2 can be continuously read from the shadow register 150, or the first data DT1 and the second data DT2 can be continuously written into the shadow register 150, instead of repeatedly specifying the addresses of the first register 210 and the second register 220. Therefore, the access efficiency can be improved.

As shown in FIG. 1, the storage device 100 further includes an enable register 170, in which the enable register 170 includes a first enable section 171 and a second enable section 172. According to an embodiment of the invention, when the controller 160 receives the initialization instruction INI generated by the host 10, the controller 160 writes a first logic level into the first enable section 171 and/or the second enable section 172 so that the first shadow section 151 is mapped to the first register section 211 and/or the second shadow section 152 is mapped to the second register section 221.

According to another embodiment of the invention, when the controller 160 writes a second logic level to the first enable section 171 and the second enable section 172, the mapping of the first shadow section 151 to the first register section 211 is stopped, and the mapping of the second shadow section 152 to the second register section 221 is stopped. In other words, when the first enable section 171 and the second enable section 172 are written at the second logic level, the mapping of the first shadow section 151 to the first register section 211 is stopped and the mapping of the second shadow section 152 to the second register section 221 is stopped. In other words, when the first enable section 171 and the second enable section 172 are written at the second logic level, the host 10 directly accesses the first register 210 and the second register 220, instead of accessing the first register 210 and the second register 220 through the storage device 100.

According to other embodiments of the invention, the controller 160 may write the first logic level into the first enable section 171 or the second register 172, and write the second logic level into the other, so that the shadow register 150 is synchronized with the first register 210 or the second register 220. Therefore, the host 10 accesses the first register 210 or the second register 220 through the storage device 100, and directly accesses the other. According to an embodiment of the invention, the first logic level and the second logic level are different.

Figure 2:
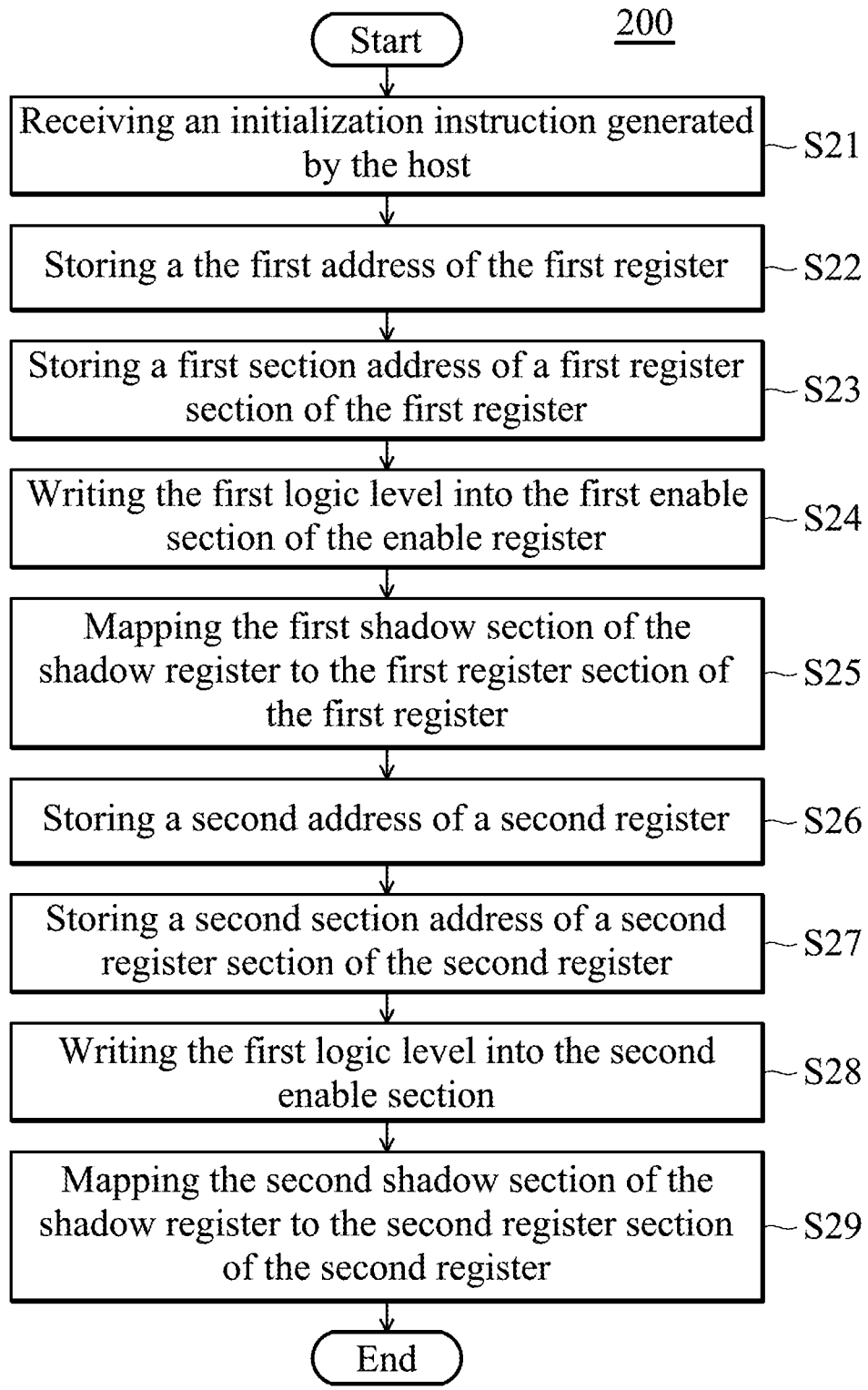
FIG. 2 is a block diagram of a mapping method in accordance with an embodiment of the invention.

FIG. 2 is a block diagram of a mapping method in accordance with an embodiment of the invention. The following description to the mapping method 200 will be accompanied with the block diagram in FIG. 1 for detailed explanation.

Firstly, the storage device 100 receives the initialization instruction INI generated by the host 10 (Step S21), and stores the first address RA1 of the first register 210 in the first mapping register 110 (Step S22). The storage device 100 also stores the first section address RS1 of the first register section 211 of the first register 210 in the first mask register 120 (Step S23).

Then, the controller 160 writes the first logic level into the first enable section 171 of the enable register 170 (Step S24), and maps the first shadow section 151 of the shadow register 150 to the first register section 211 of the first register 210 (Step S25).

In addition, the controller 160 further writes the second address RA2 of the second register 220 into the second mapping register 130 (Step S26), stores the second section address RS2 of the second register section 221 of the second register 220 into the second mask register 140 (Step S27), and writes the first logic level into the second enable section 172 of the enable register 170 (Step S28). Then, the controller 160 maps the second shadow section 152 of the shadow register 150 to the second register section 221 of the second register 220 (Step S29).

According to an embodiment of the invention, when the host 10 generates the write instruction INW to write the first data DT1 into the first register section 211 and the first enable section 171 is at the first logic level, the host 10 writes the first data DT1 into the first shadow section 151 and the controller 160 then synchronizes the first data DT1 from the first shadow section 151 to the first register section 211. According to another embodiment of the invention, when the host 10 generates the write instruction INW to write the first data DT1 into the first register section 211 and to write the second logic level into the first enable section 171, the host 10 writes the first data DT1 directly into the first register section 211.

According to an embodiment of the invention, when the host 10 generates the read instruction INR to read the first data DT1 in the first register section 211 and the first enable section 171 is at the first logic level, the host 10 reads the first shadow section 151. According to another embodiment of the invention, when the host 10 generates the read instruction INR and the first enable section 171 is at the second logic level, the host 10 reads the first data DT1 in the first register section 211 directly.

According to an embodiment of the invention, when the host 10 generates the write instruction INW to simultaneously write the first data DT1 and the second data DT2 into the first register section 211 and the second register section 221 respectively and the first enable section 171 and the second enable section 172 are at the first logic level, the host 10 writes the first data DT1 into the first shadow section 151 and writes the second data DT2 into the second shadow section 152, and the controller 160 then synchronizes the first data DT1 and the second data DT2 from the first shadow section 151 and the second shadow section 152 to the first register section 211 and the second register section 221 respectively.

According to another embodiment of the invention, when the host 10 generates the write instruction INW to simultaneously and respectively write the first data DT1 and the second data DT2 into the first register section 211 and the second register section 221 and the first enable section 171 and the second enable section 172 are at the second logic level, the host 10 writes the first data DT1 directly into the first register section 211 and it writes the second data DT2 directly into the second register section 221.

According to an embodiment of the invention, when the host 10 generates the read instruction INR to read the first data DT1 in the first register section 211 and the second data DT2 in the second register section 221 and the first enable section 171 and the second enable section 172 are at the first logic level, the host 10 reads the first data DT1 and the second data DT2 from the first shadow section 151 and the second shadow section 152 respectively.

According to another embodiment of the invention, when the host 10 generates the read instruction INR and the first enable section 171 and the second enable section 172 are at the second logic level, the host 10 reads the first data DT1 in the first register section 211 directly and the second data DT2 in the second register section 221 directly.

Since the controller 160 receives the initialization instruction INI to respectively map the first shadow section 151 and the shadow section 152 of the shadow register 150 to the first register section 211 and the second register section 221, the first data DT1 and the second data DT2 are sequentially stored in the shadow register 150. When the host 10 needs to simultaneously access the first data DT1 and the second data DT2, the first data DT1 and the second data DT2 can be sequentially accessed from the shadow register 150, or the first data DT1 and the second data DT2 can be sequentially written into the shadow register 150, instead of repeatedly specifying the addresses of the first register 210 and the second register 220. The access efficiency is therefore improved.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A storage device coupled to a host and a first register, comprising:
   a first mapping register, configured to store a first address of the first register;
   a shadow register, comprising a first shadow section, wherein the first shadow section is mapped to a first register section of the first register; and
   a controller, receiving an initialization instruction generated by the host to write the first address into the first mapping register so that the first shadow section is mapped to the first register section, wherein when the host executes a read procedure to read the first register section and a first enable section is at the first logic level, the host reads the first shadow section, wherein when the host executes the read procedure and the first enable section is at the second logic level, the host reads the first register section directly.

2. The storage device of claim 1, wherein the first register section has a first section address, wherein the first storage device further comprises:
   a first mask register, configured to store the first section address, wherein the controller further writes the first section address into the first mask register according to the initialization instruction.

3. The storage device of claim 2, further comprising:
   an enable register, comprising the first enable section, wherein when the controller writes the first logic level into the first enable section according to the initialization instruction, the first shadow section is mapped to the first register section, wherein when the controller writes the second logic level into the first enable section according to the initialization instruction, the mapping of the first shadow section to the first register section is stopped.

4. The storage device of claim 3, wherein when the host executes a write procedure to write first data into the first register section and the first enable section is at the first logic level, the host writes the first data into the first shadow section and then the controller writes the first data from the first shadow section into the first register section, wherein when the hosts executes the write procedure and the first enable section is at the second logic level, the host writes the first data directly into the first register section.

5. The storage device of claim 3, wherein the storage device is further coupled to a second register, and the second register has a second address and comprises a second register section, wherein the shadow register further comprises a second shadow section, wherein the storage device further comprises:

a second mapping register, configured to store the second address, wherein when the controller receives the initialization instruction, the controller further writes the second address into the second mapping register so that the second shadow section is mapped to the second register section.

6. The storage device of claim 5, wherein the second register section has a second section address, wherein the storage device further comprises:
a second mask register, configured to store the second section address, wherein when the controller receives the initialization instruction, the controller writes the second section address into the second mask register.

7. The storage device of claim 5, wherein the enable register further comprises a second enable section, wherein when the controller writes the first logic level into the second enable section, the second shadow section is mapped to the second register section, wherein when the controller writes the second logic level into the second enable section, the mapping of the second shadow section to the second register section is stopped.

8. The storage device of claim 7, wherein when the host executes a write procedure to write first data into the first register section and to write second data into the second register section and the first enable section and the second enable section are at the first logic level, the host writes the first data into the first shadow section and writes the second data into the second shadow section, and then the controller writes the first data from the first shadow section into the first register section and writes the second data from the second shadow section into the second register section, wherein when the host executes the write procedure and the first enable section and the second enable section are at the second logic level, the host writes the first data directly into the first register section and writes the second data directly into the second register section.

9. The storage device of claim 8, wherein when the host executes a read procedure to read the first data from the first register section and the second data from the second register section and the first enable section and the second enable section are at the first logic level, the host reads the first data from the first shadow section and reads the second data from the second shadow section, wherein when the host executes the read procedure and the first enable section and the second enable section are at the second logic level, the host reads the first data directly from the first register section and reads the second data from the second register section.

10. A mapping method adapted to a storage device, wherein the storage device is coupled to a host and a first register and comprises a shadow register, wherein the mapping method comprises:
receiving an initialization instruction generated by the host;
storing a first address of a first register according to the initialization instruction; and
mapping a first shadow section of the shadow register to a first register section of the first register, wherein when the host generates a read instruction to read the first register section and a first enable section is at a first logic level, the host reads the first shadow section, wherein when the host generates the read instruction and the first enable section is at a second logic level, the host reads the first register section directly.

11. The mapping method of claim 10, further comprising:
storing a first section address of the first register section according to the initialization instruction.

12. The mapping method of claim 11, wherein the shadow register further comprises an enable register, wherein the mapping method further comprises:
writing the first logic level into the first enable section of the enable register according to the initialization instruction;
when the first enable section is at the first logic level, mapping the first shadow section to the first register section; and
when the first enable section is at the second logic level, stopping the mapping of the first shadow section to the first register section.

13. The mapping method of claim 12, wherein when the host generates a write instruction to write first data into the first register section and the first enable section is at the first logic level, the host writes the first data into the first shadow section, and then the first data is written from the first shadow section into the first register section, wherein when the host generates the write instruction and the first enable section is at the second logic level, the host writes the first data directly into the first register section.

14. The mapping method of claim 12, wherein the storage device is further coupled to a second register, and the second register comprises a second register section, wherein the shadow register further comprises a second shadow section, wherein the mapping method further comprises:
storing a second address of the second register according to the initialization instruction; and
mapping a second shadow section of the shadow register to the second register section.

15. The mapping method of claim 14, further comprising:
storing a second section address of the second register section according to the initialization instruction.

16. The mapping method of claim 14, further comprising:
writing the first logic level into a second enable section of the enable register according to the initialization instruction;
when the second enable section is at the first logic level, mapping the second shadow section to the second register section; and
when the second enable section is at the second logic level, stopping the mapping of the second shadow section to the second register section.

17. The mapping method of claim 16, wherein when the host generates a write instruction to write first data into the first register section and to write second data into the second register section and the first enable section and the second enable section are at the first logic level, the host writes the first data into the first shadow section and writes the second data into the second shadow section, and then the first data and the second data are respectively written from the first shadow section and the second shadow section into the first register section and the second register section, wherein when the host generates the write instruction and the first enable section and the second enable section are at the second logic level, the host writes the first data directly into the first register section and writes the second data directly into the second register section.

18. The mapping method of claim 17, wherein when the host generates a read instruction to read the first data of the first register section and the second data of the second register section and the first enable section and the second enable section are at the first logic level, the host reads the first data from the first shadow section and reads the second data of the second shadow section, wherein when the host generates the read instruction and the first enable section and the second section are at the second logic level, the host reads the first data directly from the first register section and reads the second data directly from the second register section.

* * * * *